May 15, 1951 A. YONNER 2,553,228
SEWAGE DISPOSAL PLANT
Filed April 9, 1945 2 Sheets-Sheet 1

Inventor: André Yonner

May 15, 1951 — A. YONNER — 2,553,228
SEWAGE DISPOSAL PLANT
Filed April 9, 1945 — 2 Sheets-Sheet 2

INVENTOR
André Yonner

Patented May 15, 1951

2,553,228

UNITED STATES PATENT OFFICE 2,553,228

SEWAGE DISPOSAL PLANT

André Yonner, Zurich, Switzerland

Application April 9, 1945, Serial No. 587,234
In Switzerland December 21, 1943

Section 1, Public Law 690, August 8, 1946
Patent expires December 21, 1963

7 Claims. (Cl. 210—5)

A sewage plant is an urgent necessity for numerous small or middle-sized communities or townships. At the same time the capital investment for such installations proves, in many cases, an almost insurmountable obstacle. Besides, the processes known so far in sewage technique and the installations required for the purpose render it necessary or desirable to build such plants outside of inhabited quarters, chiefly in order to avoid offensive stench and annoyance caused by flies. This again leads to considerable extra costs for the necessary conduits to the sewage plant. Frequently also the large area requisite for such plants is not available in inhabited parts unless at correspondingly high prices, thus increasing still further the costs of the plant as a whole. All these disadvantages are completely eliminated by the present invention.

The invention relates to a sewage plant for mechanical clarification and biological treatment of domestic and industrial sewage water as well as for the digesting of sludge. The plant consists of at least one self-contained structural body comprising in its lower part an installation for mechanical clarification and for digesting of sluge as well as a secondary sedimentation tank while in the top part a trickling filter installation for the biological treatment is placed.

For installations serving a smaller number of inhabitants the one-body-type is advantageously chosen, in which the trickling filter for biological treatment is placed in a closed and self-contained space above the installation for mechanical clarification and for digesting of sludge. The installation thus forms one single and closed body which is provided with a device for forced aeration.

The essential advantages of this one-body-type may be described as follows:

Due to its compact design the construction costs are considerably reduced. For the same reason the area required is reduced to a minimum, thus also reducing the costs for the purchase of the building site. Due to the fact that the whole installation is located in an inclosed body all the odorous substances are absorbed in the trickling filter. Annoyance by stench or flies is avoided so that any objection to construct such plant within inhabited quarters is done away with. This again allows to shorten and thereby reduce the costs of the sewers. Thanks to the type forming a closed body, freezing of the sewage water during the cold season can be easily avoided. The plant requires only a minimum of attention thus greatly reducing the service costs. On the other hand the purification effect is at least equal to that obtained by other so far known sewage purification processes. From the building point of view the plant is easy to construct and its architectural and esthetic impression is absolutely satisfactory which statement will in many instances not be applicable to sewage plants so far in use.

In certain cases where the parting line of the effluents separates the township in a way that two different drainage nets are required each of the two nets can be treated separately by a one-body-plant whereby expensive and extensive sewers or pump-works are avoided.

If the quantity of sewage water is too large as to be treated in one single body, it is well possible to construct two or more one-body-plants side by side. Such plants consisting of two one-body-units contain two through-flow digestors, two trickling filters and two secondary sedimentation tanks. Now it is a known fact that the effect of two small digestors and secondary sedimentation tanks is not equal to the effect of one single but twice as large digestor or secondary sedimentation tank. On the other hand a subdivision of the trickling filter installation is without influence on the purifying effect. Therefore it is preferable, wherever a single one-body-plant is not sufficient, to adopt a solution with two such units, the lower part of the one containing a through-flow digestor, the lower part of the other the secondary sedimentation tank, while each of the two bodies contain in their top part a trickling filter installation. This solution represents the so-called "two-body-plant."

The larger capacity of the through-flow digestor and of the secondary sedimentation tank promotes the process of digesting and that of the secondary sedimenting; also the operation of the plant is considerably simplified and the construction costs are reduced. At the same time the scope of application of this two-body-sewage-type is considerably extended. While, under normal conditions, a single unit is sufficient for a community of 5–10,000 inhabitants the construction of a two-body-plant will allow to treat and completely purify the sewage water of towns with up to 30,000 inhabitants. An installation consisting of twice or thrice two-body-units will therefore be sufficient to effect the sewage purification of 60–90,000 inhabitants, thus ensuring for all middle-sized communities an efficient solution of their sewage problem at much reduced costs.

There are still further advantages to be derived from this kind of plant. For instance, a modification may be applied as regards the through-flow digestor. This latter was, as described above, to be placed in the lower part of the first unit and consisted of a sedimentation tank with digestor without separation of these two elements. It is of course possible to substitute this by a two-storied tank, i. e. by a plant entirely separating the two elements.

Furthermore, a plant, as described above, could only treat the sewage during dry weather because, due to the high quantity of sewage water per day and inhabitant, the dimensions of the subterranean parts are, for instance for a community of 10,000 inhabitants, already so large that it would not be possible to treat rain water in the same unit. On the other hand the rain water treatment is for sewerage systems of the mixed type (i. e. treating sewage and rain water) an absolute necessity. It is a fact that during dry weather periods solid parts of the sewage are liable to settle within the sewers. During subsequent heavy rains these sediments are being rinsed out, thus transporting large quantities of sludge into the sewage treatment plant. It is therefore necessary to construct, by the side of the plant an open rain water tank which, during rains, automatically puts itself into service. The sludge sediment of the rain water tank is then simply pumped into the digestor. In order to avoid the sewage water in the rain tank to become putrid during a long spell of dry weather the effluent of the plant is led into the rain water basin. On the other hand the possibility exists to combine the rain water basin with the secondary sedimentation tank. The volume capacity of this clarifier is generally not larger than one-third of the total cubic contents of the through-flow digestor of a two-storied tank. Seeing that the foundation depth of the through-flow digestor will usually be between 8 and 10 metres it will, in most cases, be necessary to reduce the level of subsoil water. If such reduction of level will have to be effected already for the digestor it can, without large extra costs, be extended also to the foundation trench of the secondary sedimentation tank. It will therefore be possible to give to the secondary sedimentation tank approximately the same size as to the through-flow digestor or to a two-storied installation and to utilize the surplus space for rain treatment.

This is effected simply by providing in the canal leading to the through-flow digestor or to the two-storied tank an over-flow, the latter setting itself automatically into function as soon as the maximum dry weather influent is exceeded thus leading the surplus water direct into the secondary sedimentation tank. Practice has proved that by introducing both raw so-called rain water and the humus containing discharge of the trickling filters into the same basin, i. e. into the enlarged secondary sedimentation tank, an excellent clarification effect is obtained because the flocculent sludge of the biological installation is, due to the heavy sludge particles of the raw sewage, immediately drawn into the depth where it rapidly settles. The dimensions of the clarification tank are large enough to obtain, during dry weather, sedimentation within some hours, thus ensuring an extremely high clarification effect of the biologically treated sewage. The sludge deposited within the secondary sedimentation tank can simply be transported into the common digestor by repumping.

A further alternative is to simply provide, instead of the through-flow digestor or the two-storied tank a preliminary clarifier and a separate digestor. This solution has the advantage to allow, for larger plants, to greatly reduce the cubic contents of the digestor insomuch as the sludge can be heated by means of methane gas produced within the digestor.

The accompanying sketch shows, by way of example, schematically four installations for mechanical clarification and biological treatment of domestic and industrial sewage according to the present invention.

Figures 1, 2:
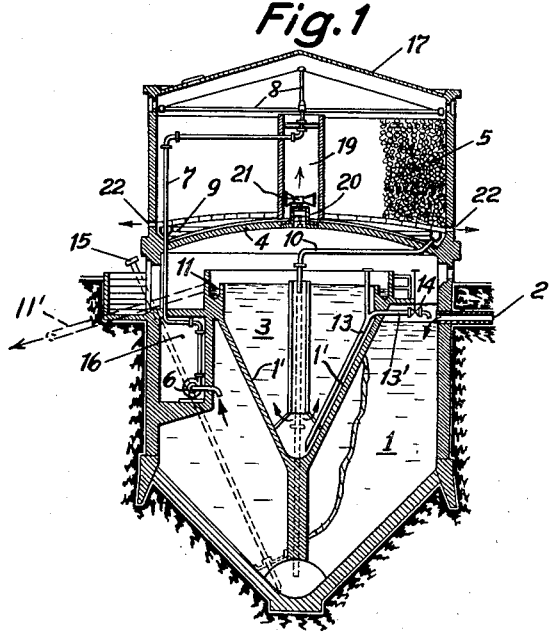
Fig. 1 shows a vertical section through a one-body-sewage-plant with sewage through-flow in the digestor.
Fig. 2 shows a vertical section through a two-body-plant, the first unit containing a through-flow digestor, the other a secondary sedimentation and rain water tank.

With regard to the one-body-sewage-plant shown in Fig. 1 the mechanical clarification is effected in a cylindrical-shaped through-flow digestor 1 the latter receiving the sewage through a conduit 2. In the centre of the through-flow digestor 1 a funnel-shaped secondary sedimentation tank 3 is provided. This part of the plant is covered by a dome-shaped vault 4 which latter serves as the bottom of the trickling filter 5 placed above it. The mechanically clarified sewage is transported into a pressure-pipe 7 by means of a pump 6, thence to a sprinkler, shown in the sketch as a rotary sprinkler 8 and subsequently distributed over the surface of the trickling filter 5. The sewage water trickles through the filter material of the trickling filter 5 where it is, in the usual way, biologically oxydized. The sewage water leaving the trickling filter 5 is collected in an annular channel 9 and thence led through a conduit 10 into the secondary clarification tank 3 where it is freed from the suspended particles of humus sludge. The purified sewage proceeds from the secondary clarification tank 3 by means of an over-flow into a conducting channel 11 placed around the tank and thence through a conduit 11 into the brook, river, lake or sea as the case may be.

The water level of the secondary sedimentation tank is arranged in a way that the sludge deposited within the funnel-shaped basin is evacuated by static pressure through a pipe 13 and 13' which latter is provided with a sluice valve 14; the sludge can then be distributed over the floating scum layer of the digestor 1. The pump 6 for evacuating the sewage out of the digestor 1 into the pressure pipe 7 is placed within a water-tight chamber 16. The space destined for the trickling filter 5 and placed above the dome-shaped vault 4 is closed by an air-tight roof 17.

In the center of the trickling filter 5 a vertical shaft 19 is placed into which a suction-pipe 20 is led located in the vertex of the dome-shaped vault. In this suction-pipe 20 a motor operated fan 21 is placed which continually sucks air from the space above the water level of the digestor 1. This air, which enters through the vertical shaft 19 into the space above the trickling filter 5, is pressed through the trickling filter 5 and can only escape after passing through the outlet openings 22 located in the body-wall. Thus not only the air quantity requisite for the biological oxydation, but at the same time the gases liberated in the course of anaerobic fermentation, especially hydrogen-sulphide, are oxydized by the so-called sulphur bacteria; therefore the air which passes through the outlet openings 22 into the open cannot cause any stench. Due to the continuous renewal of air within the space above the digestor 1 difficulties in connection with the operation of the plant are avoided.

In the sewage plant shown in Fig. 2, and consisting of two units, a through-flow digestor 23 is located in the bottom part of the first unit, the digestor being subdivided by star-shaped partition walls 24 (these walls are arranged in a similar manner as the star-shaped walls of Fig. 1) into compartments. The sewage flows into the first of these compartments through a conduit 25 and thence over an overflow into the next compartment and so forth until the last compartment is reached from which it is evacuated through a suction conduit 26 by means of a pump 27 and thence sent into an ascending pressure conduit 28 respectively 33 and 33'. When the disposal plant is in operation, the sewage will flow over the scum board and the overflow rather than directly through the sludge compartment at the bottom of digestor 23 since the accumulating sludge will clog any openings after a time so short that it can be disregarded in practice. At the bottom of the through-flow digestor 23 its compartments lead into a common sludge sedimentation space, whence the sludge can be pumped out through a pipe 29.

In the lower part of the second unit a secondary sedimentation tank 30 is provided. This tank is over-dimensioned and serves to receive, during heavy rain weather, the quantity of water exceeding the maximum dry weather discharge, i. e. the so-called rain water. For this purpose an over-flow 25' is provided in the conduit 25 which starts its function automatically as soon as the sewage water exceeds a certain maximum, the surplus being led directly by a pipe 25" to the secondary sedimentation tank 30.

The upper parts of both units are constructed exactly alike, namely corresponding to the upper part of the one-body-plant described above. The lower parts of the two units are covered by a dome-shaped vault each 31 and 31' which each form the bottom of a trickling filter 32 and 32' the latter being covered by an air-tight roof. The conduits 33 and 33' branch off from the pressure-pipe-line 28 and lead to the rotary sprinklers 34 and 34' where the water is distributed over the trickling filters 32 and 32'. The two trickling filters 32 and 32' encompass a vertical center shaft 35 and 35' respectively. These shafts each communicate with an outlet pipe 37 and 37' respectively. Motor operated fans 36 and 36' are mounted at the lower end of shafts 35 and 35' respectively. The fans 36 and 36' continually suck air out of the air spaces above the through-flow digestor 23 or respectively the secondary clarification tank 30 and the air is led to the trickling filters 32 and 32' to be pressed through these filters. Only after having passed through them the air can escape into the open by the outlet openings 38 and 38' provided in the walls of the two filters. Thus the trickling filters 32 and 32' receive the necessary air for the biological oxydation of the sewage and at the same time the gases liberated in the course of anaerobic fermentation, especially hydrogen-sulphide, are oxydized within the trickling filters 32 and 32'. Therefore the air escaping through the outlet openings 38 and 38' cannot cause any annoyance by stench. Furthermore the air in the spaces above the digester 23 and the secondary sedimentation tank 30 is continually renewed with a view to exclude difficulties in connection with the operation of the plant.

The discharge of the trickling filters 32 and 32' is collected in an annular channel 39 and 39' and directed through conduits 40 and 40' to a common entrance pipe 41 located within a central diving shaft 42 in the secondary sedimentation tank 30. From the latter the now completely clarified and purified sewage water mixed with the clarified rain water passes over an overflow into a channel 43 whence it is sent through a conduit 44 to a brook, river, lake or sea. A pipe 45 is provided in the secondary sedimentation tank 30 through which deposits of sludge are re-pumped into the through-flow digestor 23.

Figure 3:
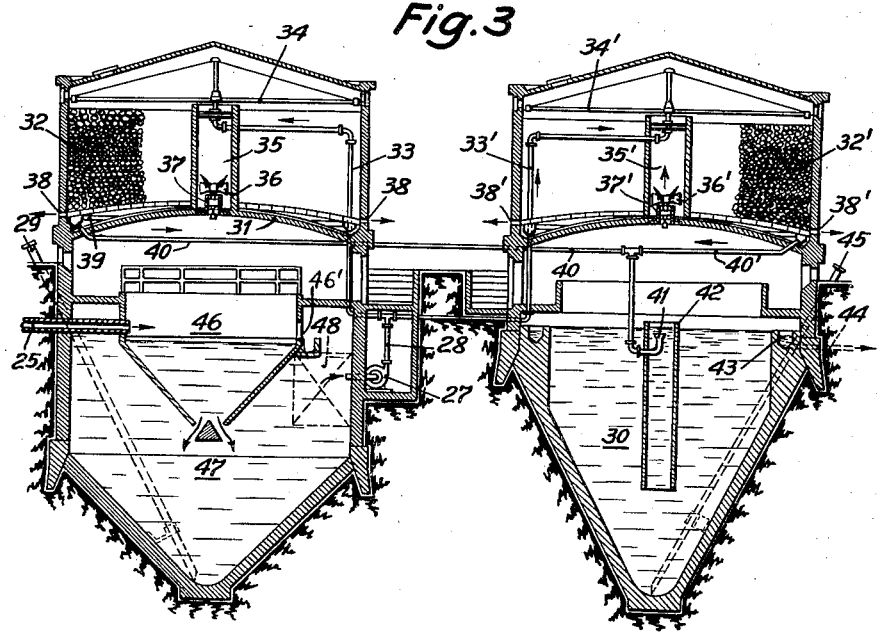
Fig. 3 shows a vertical section through a two-body-plant containing in the one unit a two-storied tank, in the second a secondary sedimentation and rain water tank.

The sewage plant shown in Fig. 3 and composed of two units differs from the previously described arrangement only inasmuch as in the lower part of the first unit a two-storied tank 46 and 47 a so-called Imhoff tank is provided instead of the through-flow digestor 23. The sewage water introduced into the plant through the conduit 25 arrives first in the clarifier 46 from which the sludge automatically slides into the digestor 47 placed below it. After having passed the clarifier 46 the sewage water is led by an overflow 46' into a pump-shaft 48 from which it is evacuated and distributed over the trickling filters. Hence clarifier 46 serves to separate sludge and water. All other parts of the first unit as well as the whole second unit are in absolute conformity with the arrangement shown in Fig. 2 and have already been described above. Therefore the reference marks used in Fig. 2 are also applied in Fig. 3 for the corresponding parts.

Figure 4:
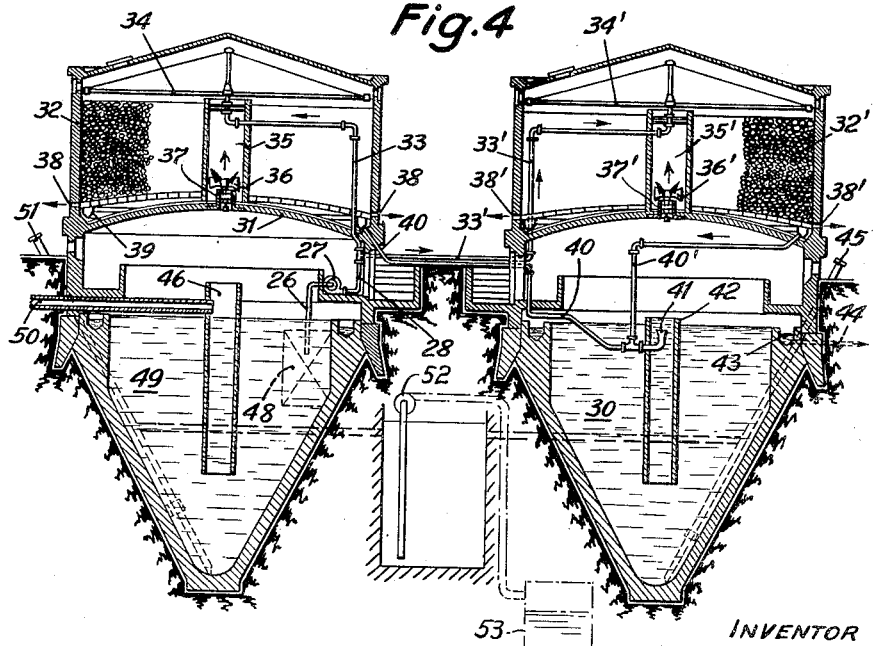
Fig. 4 shows a vertical section through a two-body-plant consisting of two units with separate digestor.

With regard to the arrangement of a sewage plant shown in Fig. 4 the whole second unit as well as the upper part of the first unit are again in perfect conformity with the arrangements shown in Figs. 2 and 3, therefore the same reference marks have again been applied for the corresponding parts. In the lower part of the first unit simply a preliminary clarification tank 49 has been provided instead of the through-flow digestor 23 or respectively of the two-storied tank 46 and 47 the sewage water being directed to the preliminary clarificator by a pipe-line 50 out of which sludge deposits are evacuated by a pipe 51 and sent by a pump 52 to a separate digestor 53. The sludge collected in the secondary clarifier 30 is also pumped by the same pump into the separate digestor 53.

What I claim is:

1. In a sewage disposal plant for disposal of domestic and industrial sewage water, in combination a substantially closed first tank, the bottom section of said tank forming a digestor for primary mechanical clarification and digestion of raw sewage, conduit means for feeding raw sewage into said digestor, a second substantially closed tank, the bottom section of said second tank forming a final settling chamber, conduit means for discharging clarified sewage water from said settling chamber, a trickling filter for biological treatment of sewage disposed in the top section of each tank above the digestor and the settling chamber respectively, conduit and pump means for feeding mechanically clarified and digested sewage from the digestor to the top of each of said filters, and conduit means for feeding the biologically treated sewage water trickling through the filters into the settling chamber.

2. A sewage disposal plant as described in claim 1, in combination with overflow means included in the conduit means for feeding raw sewage into the digestor, and conduit means connecting said overflow means with the settling chamber for feeding raw sewage flowing through the overflow means directly into the settling chamber.

3. A sewage disposal plant as described in claim 2, wherein the section of the second tank forming the final settling chamber has a larger capacity than the section of the first tank forming the digestor.

4. A sewage disposal plant as described in claim 1, wherein partition walls subdivide said digestor in several compartments, each communicating with a succeeding one through an overflow, the conduit means for feeding raw sewage into the digestor issuing into the first compartment, the conduit means for withdrawing sewage from the digestor communicating with the last compartment, a sludge collecting chamber extending through the bottom portion of all of said compartments.

5. A sewage disposal plant as described in claim 1, in combination with air conduit means within each tank extending through the respective filter and leading from an airspace above the digestor and the settling chamber respectively to an airspace above the respective filter, and suction means disposed within each of said air conduit means and arranged to suck air from the digestor airspace and the settling chamber airspace respectively into the respective filter airspace for forcing a downward air current through the filters.

6. In a sewage disposal plant for disposal of domestic and industrial sewage water, in combination a substantially closed first tank, the bottom section of said tank forming a two storied tank for primary mechanical clarification of raw sewage, conduit means for feeding raw sewage into said two storied tank, conduit and pump means for withdrawing accumulated sludge from the two storied tank, a second substantially closed tank, the bottom of said second tank forming a final settling chamber, conduit means for discharging clarified sewage water from said settling chamber, a trickling filter for biological treatment of the sewage disposed in the top section of the first and second closed tank above the two storied tank and the settling chamber respectively, conduit and pump means for feeding mechanically clarified sewage from the two storied tank to the top of each of said filters, and conduit means for feeding the biologically treated sewage, trickling through the filters, into the settling chamber.

7. In a sewage disposal plant for disposal of domestic and industrial sewage water, in combination a substantially closed first tank, the bottom section of said tank forming a primary clarification chamber for mechanical clarification of raw sewage, conduit means for feeding raw sewage into said primary clarification chamber, conduit and pump means for withdrawing accumulated sludge from said primary chamber, a second substantially closed tank, the bottom of said second tank forming a final settling chamber, conduit means for discharging clarified sewage water from said settling chamber, a trickling filter for biological treatment of the sewage disposed in the top section of each tank above the primary chamber and the final chamber respectively, conduit and pump means for feeding mechanically clarified sewage from the primary chamber to the top of each of said filters, and conduit means for feeding the biologically treated sewage, trickling through the filters, into the final settling chamber.

ANDRÉ YONNER.

REFERENCES CITED

The following references are of record in the file of this patent:

UNITED STATES PATENTS

| Number | Name | Date |
|---|---|---|
| 701,827 | Anderson et al. | June 10, 1902 |
| 1,339,561 | Imhoff et al. | Dec. 6, 1921 |
| 2,073,441 | Blunk | Mar. 9, 1937 |
| 2,141,979 | Halvorson et al. | Dec. 27, 1938 |
| 2,168,208 | Jenks | Aug. 1, 1939 |
| 2,200,580 | Pruss et al. | May 14, 1940 |
| 2,308,866 | Dekema | Jan. 19, 1943 |
| 2,340,842 | Reybold et al. | Feb. 1, 1944 |
| 2,340,848 | Reybold et al. | Feb. 1, 1944 |
| 2,355,760 | Trebler | Aug. 15, 1944 |

FOREIGN PATENTS

| Number | Country | Date |
|---|---|---|
| 16,468 | Great Britain | 1903 |
| 521,676 | Great Britain | May 28, 1940 |
| 541,560 | Great Britain | Dec. 2, 1941 |